United States Patent [19]
Boutaghou et al.

[11] Patent Number: 5,633,767
[45] Date of Patent: May 27, 1997

[54] ADAPTIVE AND IN-SITU LOAD/UNLOAD DAMAGE ESTIMATION AND COMPENSATION

[75] Inventors: Zine-Eddine Boutaghou, Owatonna; Hal H. Ottesen; Gordon J. Smith, both of Rochester, all of Minn.

[73] Assignee: International Business Machines Corporation, Armonk, N.Y.

[21] Appl. No.: 469,253

[22] Filed: Jun. 6, 1995

[51] Int. Cl.$^6$ .............................. G11B 5/09; G06F 11/00
[52] U.S. Cl. .............................................. 360/53; 371/5.1
[58] Field of Search ...................... 360/31, 69, 75, 360/77.02, 105, 128, 53; 371/20.4, 21.2, 5.1; 324/210; 369/47, 54, 53, 58

[56] References Cited

U.S. PATENT DOCUMENTS

| | | | |
|---|---|---|---|
| 3,704,363 | 11/1972 | Salmassy et al. | 360/31 |
| 4,516,162 | 5/1985 | West | 360/25 |
| 4,731,680 | 3/1988 | Moriyama et al. | 360/78 |
| 4,769,804 | 9/1988 | Satoh et al. | 369/58 |
| 4,969,139 | 11/1990 | Azumatani et al. | 369/54 |
| 5,034,939 | 7/1991 | Kurz et al. | 369/44.32 |
| 5,068,754 | 11/1991 | Garde | 360/45 |
| 5,121,263 | 6/1992 | Kerwin et al. | 360/53 |
| 5,218,590 | 6/1993 | Miyasaka | 369/54 |
| 5,227,212 | 7/1993 | Ahlert et al. | 360/97.01 |
| 5,351,156 | 9/1994 | Gregory et al. | 360/69 |
| 5,513,160 | 4/1996 | Satoh et al. | 369/47 |

FOREIGN PATENT DOCUMENTS

| | | | |
|---|---|---|---|
| 2 026 208 | 1/1980 | United Kingdom | G05B 9/02 |

*Primary Examiner*—W. C. Kim
*Assistant Examiner*—Regina Y. Neal
*Attorney, Agent, or Firm*—Richard E. Billion; Owen J. Gamon

[57] ABSTRACT

The present invention overcomes the problems that accompany the use of ramps to load and unload transducer carrying sliders in rigid magnetic disk data storage devices. The tracks in the region where the slider loads and unloads are read and the errors recorded following each slider loading operation. One technique is to track the error increase and identify imminent device failure when the rate of error increase during a given number of the most recent slider load cycles exceeds a threshold value. In another mode, a dedicated sequence of tracks is recorded at an increased linear density to assure that read errors occur to enable a more effective comparative evaluation. This makes possible a two stage evaluation, a first threshold number of errors indicative of degrading performance which initiates lower actuator velocity to inhibit further degradation and a second threshold error quantity that indicates imminent catastrophic failure and triggers a warning to the system user. To make the analysis more meaningful, certain errors may be ignored, such as simpler errors or the full number of errors in a cluster that may be the result of a single event.

9 Claims, 4 Drawing Sheets

ADAPTIVE AND IN-SITU LOAD/UNLOAD DAMAGE ESTIMATION AND COMPENSATION

FIELD OF THE INVENTION

The present invention pertains to rigid disk data storage devices and more particularly to operational methods and structures for adaptively avoiding and warning of imminent catastrophic device failure.

BACKGROUND OF THE INVENTION

Resistance to shock damage is important with respect to any rigid disk storage device, but is a critical concern in smaller drives used in portable devices such as lap top computers. Larger disk drives are subject to occasional shock conditions whereas small drives incorporated in portable equipment are regularly exposed to impact forces that often exceed 1000 g's. The common practice to overcome possible damage when the drive is not in use is the provision of a ramp structure to displace and support the transducer carrying sliders away from the disk surface. Using the load/unload (L/UL) technique, a ramp supports the suspension to retain the slider out of contact with the disk surface. Upon receipt of a read or write command, the slider is loaded from the ramp to a near contact transducing relationship with the data surface of the rotating disk and when the drive is subsequently idle, the actuator causes the suspension to engage the ramp and unload or remove the slider from data transducing cooperation with the disk data surface. In those systems that seek to power down the disk drive when not in use to effect power saving, L/UL cycles are a frequent occurrence. However, the use of the L/UL technique presents its own characteristic problems. While a rigid disk magnetic disk drive is a device wherein the head or slider that carries the transducer is separated from the disk during operation by a film of air between the air bearing surface and the disk media surface, the thickness of the film of air between the slider and media has become so small that occasional contact may be expected. With the fly height of state of the art sliders no more than 2.5 microinches above the media surface, it will be appreciated that only a minuscule asperity on the disk surface, minute particulate particle, or slight pitch or roll of the slider will result in contact between slider and disk or impose a foreign object that damages both disk and the slider air bearing surfaces. With such near contact operation, the engagement of the suspension with the ramp as the slider is unloaded or the departure from ramp engagement as the slider is loaded present occasions wherein there is an increased likelihood of undesired contact. Further, with current densities of more than 4000 tracks per inch, linear densities over 130 thousand bits per inch and the necessary magnetic coating thickness measured in angstroms, very little scratching or abrasion of the media is sufficient to destroy data and create an error condition. Since at each disk surface the slider will load and unload at random angular positions about the disk surface, a distribution of errors will occur if the L/UL mechanism fails to load and or unload correctly. As a result of slider/disk contact, particularly during loading when the slider may engage the disk and unloading when the slider may also engage the disk surface, the slider corners are damaged and the disk is scratched. The level of damage depends upon the particular slider/air bearing design, disk material, loading speed, air bearing roll and pitch stiffness, and disk runout. During slider/disk contact particulates from both the damaged slider and the scratched disk may be generated. As the number of head/disk contacts increase, the air bearing performance deteriorates rapidly. All the ingredients for a catastrophic failure are present and no early warning system exists to alert the user to impending failure. In the event that the slider contacts the disk, and depending upon the severity of the contact, a slider imprint forms on the disk which can easily be seen with the aid of modest magnification. During subsequent loadings, the slider may encounter the imprint, causing additional contacts around the imprint area. This cumulative contact causes further deterioration of the slider and media.

Drives designed for use in portable equipment are expected to survive a million load/unload cycles without damage, thus the importance of failure anticipation. Current drives are expected to have hundreds of thousands of power on hours of service before mean time to failure. In practice the operation of the devices is taken for granted and the possibility of failure ignored. When the time arrives for replacement to avoid the loss of valuable data, it is important that the user have an awareness. This may occur after a long useful life or a shortened life, due for example to a portable device being subjected to shock or rough handling.

SUMMARY OF THE INVENTION

In disk drive devices which unload sliders using a ramp when the drive is not functioning to read or write data, the present invention affords a reliable indication that a catastrophic failure may be imminent which would suggest to a prudent system operator that the drive be replaced to avert a massive loss of data. By analyzing the read errors that occur in the band of tracks that are most influenced by load/unload operations it is possible to anticipate the approach of the catastrophic failure of a slider/disk combination.

In one form of the invention, the disk is formatted to make maximum use of the disk real estate including user data tracks in the region at which the transducer carrying sliders load and unload. A band of data tracks in the region which the outer rail edge of the slider overlies as the slider is released to fly over the disk or lifted away from the disk surface during unloading are read and the number of errors sensed and recorded following each loading of the slider. The read errors are recorded after each load operation including the initial power on cycle at time of manufacture. The increase in the number of read errors over a number of slider load/unload cycles, such as the most recent one hundred load/unload cycles, is used to determine when the occurrence of errors is accelerating. When the errors accumulate with a rapidity that exceeds a threshold that has been established as indication of a failing device, the user is signaled that a device failure can be anticipated.

Another mode of practicing the invention is the use of a series of dedicated tracks in the slider loading zone that are written with a test pattern and read following each occasion that the slider is loaded onto the disk from the ramp. This would normally occur during the first idle period following the read or write command that initiated drive operation and the loading of the slider. Disk drives are usually meticulously designed and carefully manufactured to assure long life and reliable performance. It is common for a drive with more than 500 hours power on use to have encountered no read errors. Thus, to make the analysis of the present invention more effective the test pattern is written at an increased linear density to force an increased error count when those tracks are read. In practicing the invention, the sum of the read errors that are sensed and recorded from the test tracks is compared to a pair of thresholds. A first error level in a test track set indicates that the corresponding slider/disk combination is stressed through the combined degradation of the slider and disk surface. The mode of operation of the actuator is altered by reducing the actuator velocity during loading of the slider onto the disk, which will extend the life of the apparatus and defer the time when the drive should be replaced. This change of operating mode is invoked without user intervention and provides an adaptive control to continue proper device function and extend the functional life of the drive. When the read error sum during a test pattern read operation reaches a second, higher level, the user is signaled that failure may soon occur.

In either approach it may make the analysis a more effective representation of drive condition if the more simple errors are excluded from the analysis. Thus the method may ignore the very lowest level or levels of read error, such as those that are recovered by a single reread. In the environment where the data density has been increased in a dedicated test region to stress the system, counting the number of hard errors is probably a highly effective way of detecting slider/disk contact since an air bearing imprint can easily be seen on the disk during slider/disk contact.

DETAILED DESCRIPTION

Figure 1:
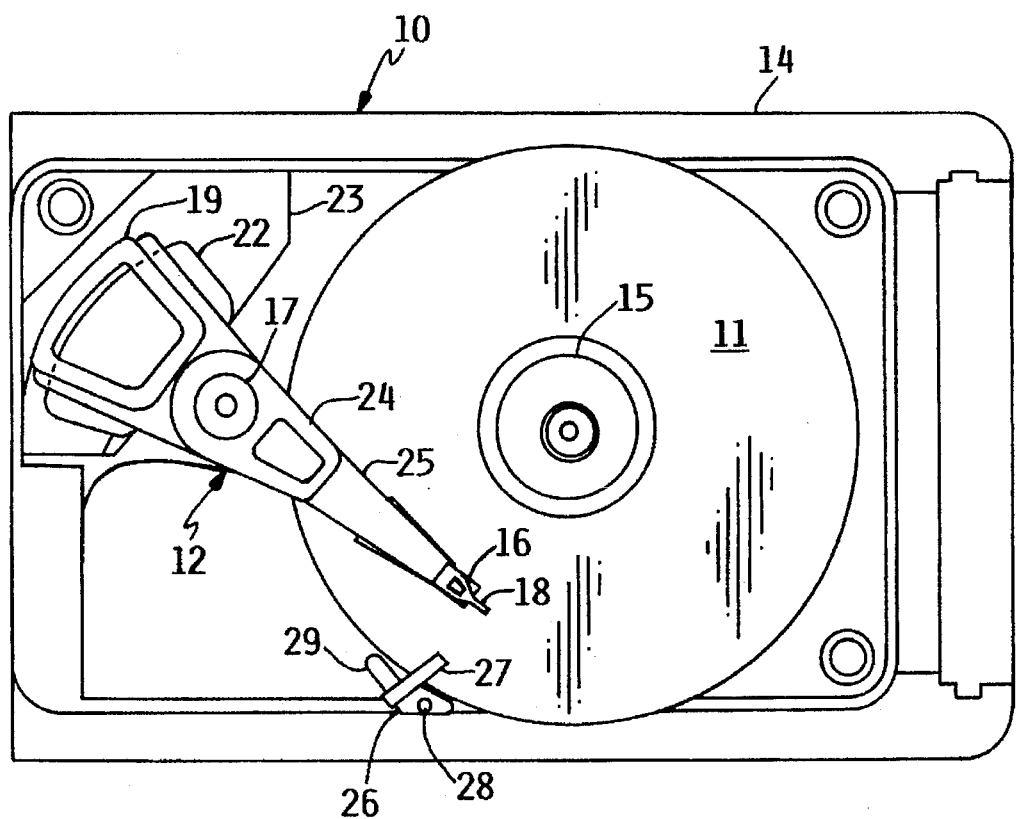
FIG. 1 is a plan view of a typical small drive with portions removed to illustrate the actuator and load/unload ramp structure.

FIG. 1 shows a Personal Computer Memory Card Industry Association (PCMCIA) rigid magnetic disk drive 10 including a 1.8 inch diameter disk 11 and a rotary actuator 12 mounted on a base 14 with the cover, most electronics and the voice coil motor top plate removed. The dimensions of the PCMCIA type II drive is approximately 3¼ and 2 inches in length and width respectively with a maximum height of 5 mm. Data is stored on the magnetic disk 11 supported on base 14 and rotated by a spindle motor 15 mounted concentrically within the disk. The disk has a super finished substrate to enable cooperation with a transducer carrying head or slider 16 supported by an air bearing on a film of air that at the current state of the art does not exceed 2.5 microinches. To achieve current optimum storage density exceeding 600 MB per square inch, the most successful transducer technology is the magneto resistive (MR) head. This transducing device is actually two closely overlying transducers, an MR transducer which reads data and a thin film transducer which writes data.

The drive uses a rotary actuator 12 mounted on cast base 14 about bearing 17. The actuator is driven by a flat voice coil 19 that is positioned in a magnetic flux field created by permanent magnet 22 with the flux concentrated in the gap by magnetically permeable lower plate 23 and a top cover (that has been removed). Rigid arms 24 support flexures 25 that provide slider 16 at the flexure distal end a first degree of freedom permitting it to rise and fall. The slider mounting includes a gimbal structure to accommodate pitch and roll and a projection 18 which engages a load/unload ramp 27 to lift and park the slider when the device is not functioning to read or write data from or to the disk surface by rotating the actuator toward the disk outside diameter. The ramp assembly 26 is secured to base 14 by a screw 28 and has formed as integral portions thereof, a ramp 27 which extends to overlie the disk surface where it presents an inclined surface that is engaged by projection 18 to lift the slider from the disk surface and a stop 29 that is engaged by the actuator suspension to limit slider motion in the event of shock and assure no plastic deformation of the suspension.

The drive includes a microprocessor to control drive operations and data transfer over the data channel. Operation of the storage device is supported by a massive amount of data which is stored in nonvolatile storage in the reserved areas of the disk surfaces. The support data not only identifies the device, its history and the level of electronics, code and structural technology; but also includes extensive tables of data relative to data errors associated with each slider/disk combination including error location, time (in power on hours of operation), type and source or error, the level of error recovery used (which may include 150 levels of recovery) and the number of retries associated with each error recovery. Additionally, most data is redundantly stored to assure that the data can be recovered even if a disk surface is subject to an irrecoverable failure. Accordingly, the error data needed to practice the present invention is already being collected and stored to enable a drive history for supporting any necessary diagnostics during drive life.

The most significant damage to the disk is occasioned by contact with the outermost rail edges of the slider air bearing surfaces. Likewise these slider regions are the most susceptible to damage as a result of disk contact that would lead to impaired head operation. With the transducer element positioned at the center of the slider, it is not possible to read tracks at the load/unload location of the outermost slider rail edge when an outer diameter ramp is used or the load/unload location of the innermost slider rail edge when an inner diameter ramp is used. In the first implementation of the present invention, a band of tracks is selected for error analysis which encompasses the location at which the outer air bearing surface rail edge loads and unloads on the data portion of the disk surface would be aligned at the time that the slider loads onto the disk from the ramp while allowing for structural tolerances.

Figure 2:
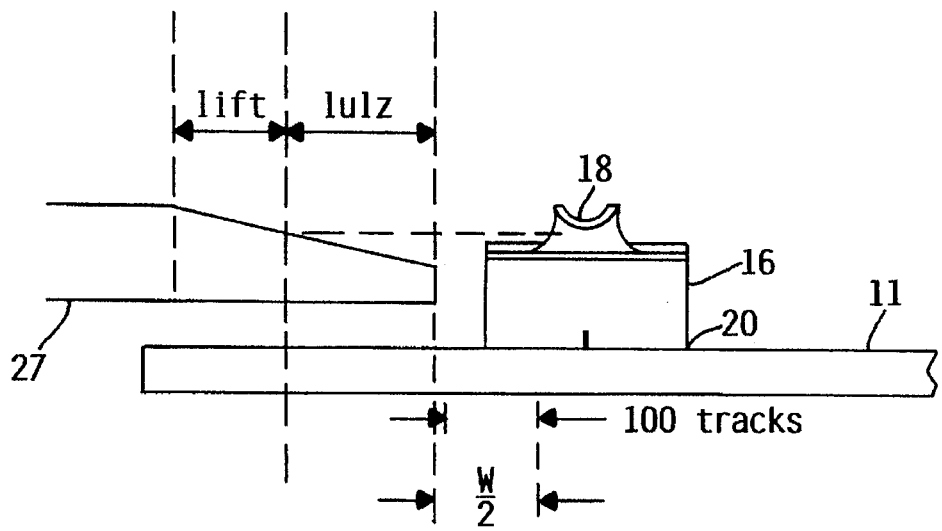
FIG. 2 is a schematic view of a disk, ramp and slider relationship showing the parameters implementing a first embodiment of the invention.

As seen in FIG. 2, the ramp 27 overlies the marginal edge of disk 11 and engages the suspension projection 18 as the actuator pivots the slider toward the disk outer diameter to lift the slider 16 from the disk surface. The slider rail edge 20 overlies the disk data area during the unloading and loading of the slider. The selected band of tracks in this example is, as shown, 100 tracks extending radially outward from a location one half the slider width $^{(w)}/_2$ from the load/unload zone (lulz). This band of tracks encompasses the range of tracks where the rail edge of interest may contact the disk during loading and unloading irrespective of part and assembly tolerances. At the time of manufacture, the total number of recovered errors in the band of selected tracks is determined and saved. The error recovery procedure used to recover particular errors may also be stored for future reference. A disk drive usually has a variety of error recovery procedures used to recover errors. The actual number of errors in the load/unload zone may not be significant. If the number of errors increase at a slow and irregular rate, there may not be an imminent failure condition or problem even if the number of errors within the analyzed bands become numerous. If such errors impair drive performance, the normal "housekeeping" functions of the drive will sense the condition and relocate the data to an alternate track or cylinder location. However, if the rate of error occurrence increases beyond a threshold, it can be anticipated that the occurrence of errors will continue to increase and probably at an accelerated rate until device failure, or at least total failure of the particular slider/disk combination occurs. Thus, the rate of read error increase within the bands of tracks being analyzed is an indicator of imminent device failure.

As in the illustrated example, it may be determined that the band of 100 tracks will encompass the location that the slider air bearing rail edge of interest overlies the disk at the time the slider is unloaded from the ramp or is loaded onto the ramp irrespective of deviations caused by structural part tolerances or assembly tolerances. The error analysis may be varied to accommodate the particular device design, but a typical analysis would be to look for a read error rate of increase such as an increase of 200 read errors within the selected bands during the most recent 100 head load/unload operations.

Figure 3:
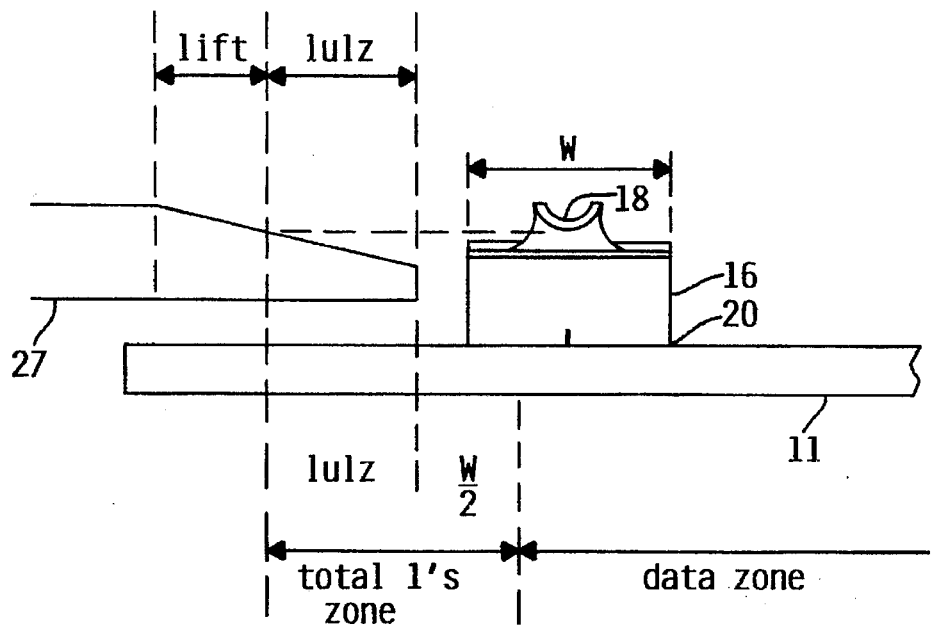
FIG. 3 is a view similar to that of FIG. 2 illustrating a second embodiment of the invention.

The embodiment schematically illustrated in FIG. 3 uses an all 1's pattern recorded at an elevated linear density in a dedicated band of tracks to sense and evaluate the occurrence of read errors. Further, adaptive control can be included to extend the life of the drive when the read error level exceeds a threshold. In a PCMCIA rigid disk drive the width of the Load/Unload Zone (lulz) is determined by the slope of the ramp. For a 1.8 inch PCMCIA drive the lulz width is about 0.7 mm for a 12 degree ramp with the lulz physically located under the ramp. At an areal recording density of 600 Mb/in$^2$ corresponding to a linear density of 133 kbpi and a track density of 4500 tpi enables prerecording of 124 tracks using a 12 degree lulz ramp angle. To preserve the continuity, these tracks could be recorded with a special test pattern in an in-bound spiral.

Rigid disk data storage disk drives typically meet a standard wherein the average Soft Error Rate (SER) is not in excess of $10^{-10}$ error/data bit. At 3600 RPM spindle velocity, it would take over 27 seconds to get one single bit error. This time is obviously too long, since the 124 tracks would be read in 2.1 seconds. Thus a test pattern is needed that has a higher error rate. The empirical "6% rule" in magnetic recording states, "For every 6% increase in linear density, there will be about one order of magnitude increase in the SER". By increasing the linear density of the all "1's" test pattern 18%, the soft error rate should be increased by three orders of magnitude to $10^{-7}$. In the current example, this would mean increasing the linear density from 133.3 kbpi to 157.3 kbpi in order to produce the higher error rate. This SER would, on average, yield 91 errors reading the test pattern using a lulz ramp with a 12 degree ramp angle. Since it is necessary to follow the test pattern tracks in the lulz, it is also necessary to extend the servo sectors beyond the lulz. From a Servo Track Write (STW) process point of view, this requires that the L/UL ramp be installed after the STW has been completed. Although this condition must be accommodated, it is not a problem.

Figure 4:
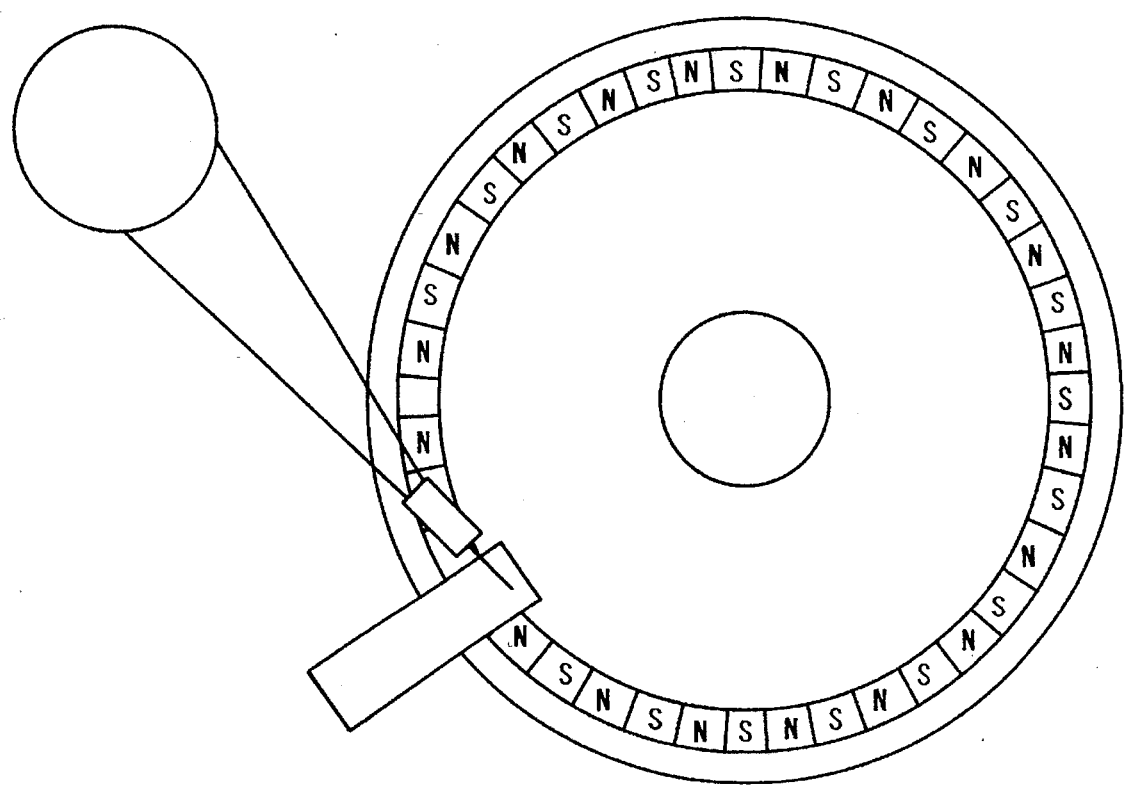
FIG. 4 schematically shows the all 1's recording used in the embodiment of FIG. 3.

The special test pattern, conceptually shown in FIG. 4 without the preferred spiral form, is an all "1's" pattern. The number of errors read is then simply the number of "0's" detected in the test pattern. In actual operation the test pattern is read for a certain number of whole revolutions N, and the Soft Error Per Track (SEPT) calculated, ie., compute SEPT=S 0s/N. The SEPT is measured for each head j and is designated SEPT(j). The degree of deterioration is determined from the normalized difference as found by the equation:

$$\Delta SEPT(j) = \frac{SEPT(j) - SEPT(j,0)}{SEPT(j,0)}$$

The location of the MR transducer element in the center of the slider does not permit the assessment of potential damage to the outer rail for the OD ramp design and the inner rail for an ID ramp design. During slider/disk contact, the slider undergoes an oscillatory motion. Thus, during slider and disk contact both inner and outer rails contact the disk and it is sufficient to measure the SER for half the slider width to determine potential damage to the recording media and deterioration of the air bearing performance.

Figure 5:
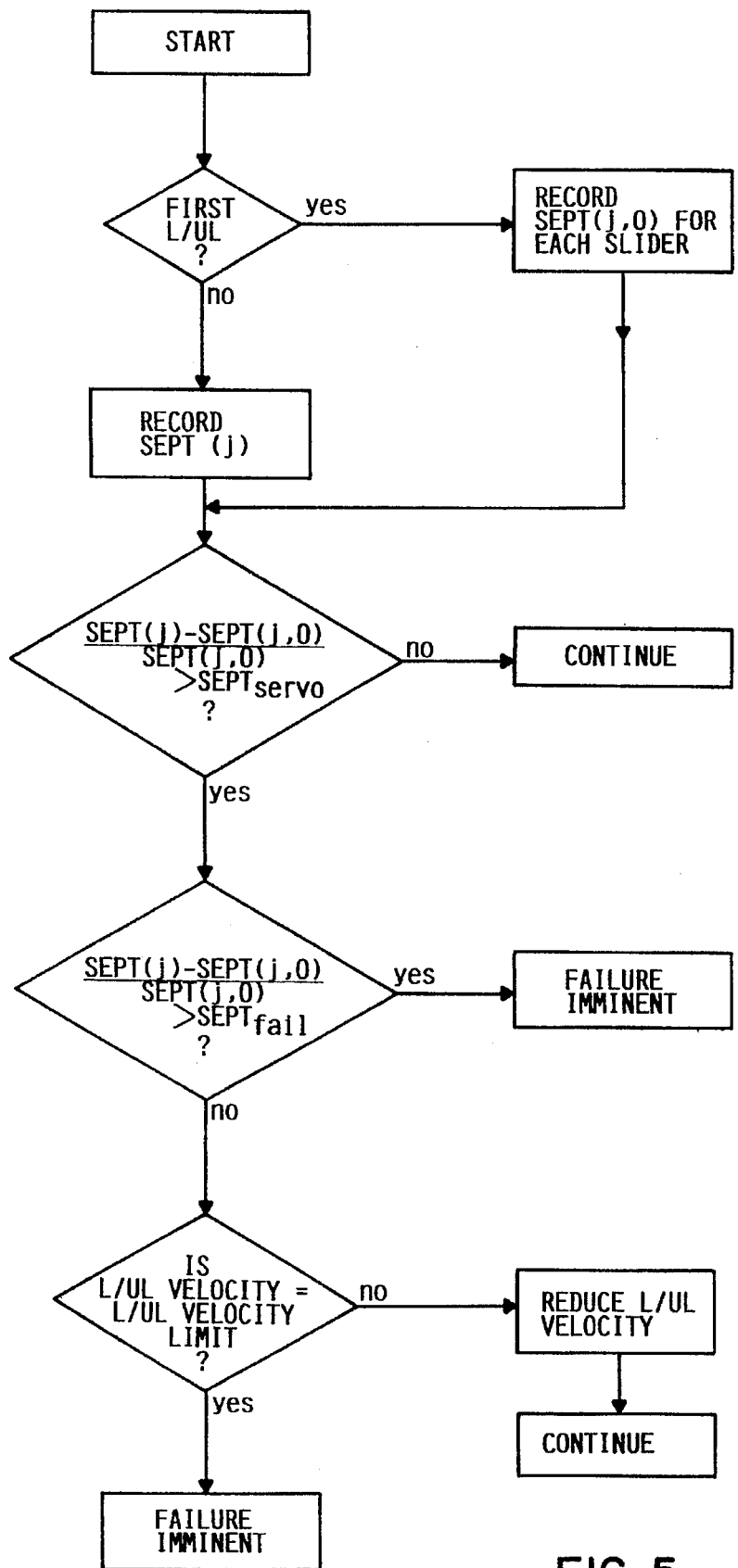
FIG. 5 is a flow chart illustrating the combined adaptive control and imminent failure warning implemented by the embodiment of FIG. 3.

Referring to the flow diagram of FIG. 5, the following scenario can be constructed for the method of adaptive damage control. At the time the sliders are first loaded onto the disk surfaces (at manufacturing time) the average soft error per track, SEPT(j,0) is recorded for each slider j. For future load/unload operations, the test pattern is read to determine the SEPT(j) for each slider. The degree of deterioration for each slider is determined by the DSEPT(j) defined above. If DSEPT(j) exceeds a servo threshold value, $SEPT_{servo}$, a reduction of the load/unload velocity is invoked for future loads. If DSEPT(j) exceeds both the servo threshold value and a failure threshold value $SEPT_{fail}$, a warning is sent to the user indicating the possibility of imminent failure.

In any mode of practicing the invention the analysis may be found to be more meaningful if certain read errors are ignored. The simpler errors that result in only a single reread may not recur and accordingly are less useful in evaluating drive degradation or possible imminent failure. Cluster errors represent another condition that is usually not reflective of an actual degradation or likely failure condition if fully recognized. Cluster errors are normally the result of a single event that may overstate the error condition.

While the invention has been particularly shown and described with reference to preferred embodiments, it will be understood by those skilled in the art that various changes in form and details may be made therein without departing from the spirit and scope of the invention.

What is claimed is:

1. In a rigid disk data storage device having a rotating data storage disk and an actuator for supporting a transducer carrying slider in read/write confronting relation to said rotating disk and including a ramp structure for unloading the slider when pending read/write operations have been completed, a method for anticipating impending device failure comprising the steps of:

defining a series of tracks within which the slider achieves read/write cooperation with the confronting disk surface when the slider is being loaded from said ramp;

reading said series of tracks to enable sensing and recording of the number of read errors;

comparing the current number of sensed read errors encountered reading said series of tracks to the number of read errors sensed during a prior reading of said series of tracks following transducer loading;

identifying when the number of read errors sensed during the current reading of said series of tracks indicates that the corresponding slider/disk combination is approaching failure;

recording test data on said series of tracks at an increased linear density to increase the number of read errors encountered and recorded during a reading of said series of tracks;

classifying read errors, sensed and recorded during the step of reading said series of tracks subsequent to the loading of the slider from said ramp, in accordance with the type of read error and the error recovery procedure used to correct such read error; and excluding from the error count, recorded for the purpose of identifying approaching device failure, selected types of read errors.

2. In a rigid disk data storage device having a rotating data storage disk and an actuator for supporting a transducer carrying slider in read/write confronting relation to said rotating disk and including a ramp structure for unloading the slider when pending read/write operations have been completed, a method for anticipating impending device failure comprising the steps of:

defining a series of tracks within which the slider achieves read/write cooperation with the confronting disk surface when the slider is being loaded from said ramp, wherein said defining step further comprises establishing the sequence of tracks that encompasses radial track locations underlying the slider rail edge that first extends beyond the ramp during slider loading as the transducer approaches and first achieves data read/write cooperation with the disk;

reading said series of tracks to enable sensing and recording of the number of read errors;

comparing the current number of sensed read errors encountered reading said series of tracks to the number of read errors sensed during a prior reading of said series of tracks following transducer loading;

identifying when the number of read errors sensed during the current reading of said series of tracks indicates that the corresponding slider/disk combination is approaching failure, wherein the identifying step further comprises identifying the increase in the read error count during a predetermined number of the most recent load/unload cycles; and excluding from each of said error counts sensed, following the loading of the slider from the ramp, predetermined lesser type errors, and wherein said method is conducted with respect to each slider/disk combination within said rigid disk data storage device.

3. The method of claim 2 wherein said step of identifying the number of read errors indicative of approaching failure comprises determining whether the read error rate increase over a predetermined number of load/unload cycles exceeds a set number.

4. In a rigid disk data storage device including a data storage disk, a transducer carrying slider, an actuator for supporting and positioning the transducer in alignment with a selected data track on the surface of said disk and a ramp structure for unloading the slider when the drive is not reading or writing data and to load the transducer to a read/write cooperating relationship with the disk surface when a read or write command is to be executed, a method for anticipating device failure comprising:

selecting a band of tracks that includes the landing zone for the outermost rail edge of the slider air bearing surface;

reading said band of tracks following each slider loading operation and recording the number of errors encountered, wherein the step of reading and recording read errors includes excluding selected read errors;

determining the increase in the number of read errors over a predetermined number of the most recent transducer loading cycles;

comparing said increase in the number of read errors to a threshold value; and initiating a warning when said increase in the number of read errors exceeds said threshold value.

5. The method of claim 4 wherein said selected band of tracks is read during the first idle period following a read or write command that initiates loading the slider from the ramp.

6. The method of claim 5 wherein the selected band of tracks includes the range of tracks on which the outermost rail edge, at the radially inward side of the slider with respect to the disk, lands using a ramp at the outer diameter of the disk.

7. In a rigid disk data storage device including a data storage disk, a slider carrying actuator for positioning a transducer, carried by the slider, in alignment with a selected data track on the surface of the disk and a ramp structure for unloading the slider when the drive is not operating to read or write data and to load the slider to place the transducer in a read/write cooperating relationship with the disk surface when a read or write command is to be executed, a method of adaptive control comprising:

selecting a band of dedicated tracks including the sequence of radial track locations underlying the slider outermost rail edge that first extends beyond the ramp during slider loading;

recording a test pattern on said band of tracks at an increased linear recording density;

reading said band of tracks periodically and comparing the number of read errors to a first threshold value indicative of device degradation;

altering device operation when the current number of read errors exceeds said first threshold; and comparing the number of read errors to a second, higher threshold indicative of imminent possibility of device failure and initiating a warning when said number of read errors exceeds said second threshold.

8. The method of claim 7 wherein the step of reading said band of tracks comprises reading the tracks and recording the read errors and ignoring selected errors which are less representative of device degradation.

9. The method of claim 8 wherein the selected band of tracks includes the range of tracks at which the outermost rail edge, at the radially inward side of the slider with respect to the disk, lands using a ramp at the outer diameter of the disk.

* * * * *